United States Patent [19]

Briley

[11] 4,248,049

[45] Feb. 3, 1981

[54] TEMPERATURE CONDITIONING SYSTEM SUITABLE FOR USE WITH A SOLAR ENERGY COLLECTION AND STORAGE APPARATUS OR A LOW TEMPERATURE ENERGY SOURCE

[75] Inventor: Patrick B. Briley, Tulsa, Okla.

[73] Assignee: Hybrid Energy Systems, Inc., Stillwater, Okla.

[21] Appl. No.: 55,524

[22] Filed: Jul. 9, 1979

Related U.S. Application Data

[63] Continuation-in-part of Ser. No. 948,043, Oct. 2, 1978, abandoned.

[51] Int. Cl.³ .............................................. F25B 27/00
[52] U.S. Cl. .............................................. 62/2; 126/437; 165/45; 237/2 B
[58] Field of Search .............. 62/2, 238 E; 165/48 S, 165/45; 126/400, 427, 437

[56] References Cited

U.S. PATENT DOCUMENTS

| | | | |
|---|---|---|---|
| 2,030,350 | 2/1936 | Bremser | 62/2 |
| 2,396,338 | 3/1946 | Newton | 62/2 X |
| 2,529,154 | 11/1950 | Hammond et al. | 62/2 X |
| 2,689,090 | 9/1954 | Wetherbee et al. | 62/2 X |
| 2,693,939 | 11/1954 | Marchant et al. | 237/2 B |
| 2,713,252 | 7/1955 | Jackson et al. | 62/2 X |
| 3,087,309 | 4/1963 | Toulmin, Jr. | 62/2 |
| 3,841,302 | 10/1974 | Falbel | 62/2 |
| 3,886,998 | 6/1975 | Rowekamp | 126/400 |
| 3,893,506 | 7/1975 | Laing | 165/18 |
| 3,910,490 | 10/1975 | Saypalia, Jr. | 237/1 A |
| 3,931,851 | 1/1976 | Harris et al. | 165/2 |
| 3,935,897 | 2/1976 | Pulver | 62/2 |
| 3,960,322 | 6/1976 | Ruff et al. | 62/2 |
| 3,965,972 | 6/1976 | Petersen | 165/45 |
| 3,991,938 | 11/1976 | Ramey | 62/2 |
| 4,007,776 | 2/1977 | Alkasab | 62/2 |
| 4,012,920 | 3/1977 | Kirschbaum | 62/2 |
| 4,015,962 | 4/1977 | Tompkins | 62/2 |
| 4,019,495 | 4/1977 | Frazier | 126/437 |
| 4,143,814 | 3/1979 | Hill, Jr. | 126/437 |
| 4,153,104 | 5/1979 | Ruder | 62/2 |

*Primary Examiner*—Lloyd L. King
*Attorney, Agent, or Firm*—Laney, Dougherty, Hessin & Beavers

[57] ABSTRACT

A temperature conditioning system employing an ejector-type compressor and a refrigerant selected for operation at the limited operating temperatures of a heat energy collection and storage apparatus. Improved performance may be achieved by employing a two-tank storage system having a control circuit for supplying heat transfer medium from the hotter of the tanks for return to the cooler.

35 Claims, 2 Drawing Figures

TEMPERATURE CONDITIONING SYSTEM SUITABLE FOR USE WITH A SOLAR ENERGY COLLECTION AND STORAGE APPARATUS OR A LOW TEMPERATURE ENERGY SOURCE

CROSS REFERENCE TO RELATED APPLICATION

The present invention is a continuation-in-part of U.S. Pat. application Ser. No. 948,043 filed Oct. 2, 1978, and now abandoned.

SUMMARY OF THE INVENTION

The present invention relates generally to a temperature conditioning system employing ejector-type compressor, and, more particularly, but not by way of limitation, to a temperature conditioning system employing an ejector-type compressor with a refrigerant selected for operation at the limited temperatures provided by a heat energy collection and storage apparatus.

In one aspect, the present invention relates generally to a temperature conditioning system employing an ejector-type compressor, and, more particularly, but not by way of limitation, to a temperature conditioning system employing an ejector-type compressor with a refrigerant selected for operation at the limited temperatures provided by a solar energy collection and storage apparatus.

PRIOR ART STATEMENT

As can be seen from the following patents, it has frequently been proposed to employ solar energy as a heat source for rendering more efficient the operation of conventional heat pumps and the like: U.S. Pat. Nos. 2,529,154 (Hammond, et al.); 2,689,090 (Wetherbee, et al.); 2,693,939 (Marchant, et al.); 2,713,252 (Jackson, et al.); 3,960,322 (Ruff, et al.) and 3,991,938 (Ramey). On the other hand, the ability of flat plate solar collectors to radiate as well as absorb heat has been used to advantage to directly cool a heat transfer medium, as can be seen in the following patents: U.S. Pat. Nos. 2,396,338 (Newton); 3,841,302 (Falbel); and 3,893,506 (Laing). Such radiative cooling can be further enhanced by facilitating evaporation of the cooling medium to the atmosphere as seen in the following patents: U.S. Pat. Nos. 3,886,998 (Rowekamp); 3,910,490 (Saypalia, Jr.); 3,931,851 (Harris, et al.); and 3,965,972 (Petersen). An application of these principles to a large scale installation which is particularly well adapted to benefit from controlled shading is disclosed in U.S. Pat. No. 3,935,897 (Pulver).

In contrast to the radiation-type devices, recent developments have been primarily in the areas of photovoltaic, absorption or Rankine cycle systems. The photovoltaic systems, such as that shown in U.S. Pat. No. 3,087,309 (Toulmin, Jr.), have been greatly hendered by the excessive cost and low efficiency of commercially available solar energy conversion cells. However, the recent development of amorphous silicon photovoltaic devices of the type taught in U.S. Pat. No. 4,109,271 (Pankove) may dramatically improve the competitive position of such systems. On the other hand, absorption chillers, similar to that shown in U.S. Pat. No. 2,030,350 (Bremser), have been commercially available for a number of years, although home-sized units have appeared only recently. Similarly, relatively small Rankine cycle units have only recently become available as a result of improvements in the efficiencies of key operating components in the cycle. A general discussion on recent developments in absorption and Rankine cycle units, as well as the operating characteristics and manufacturers thereof, can be found on pages 18 to 37 of the May 1978 issue of "Solar Engineering Magazine" published by Solar Engineering Publishers, Inc. of Dallas, Tex.

Although ejector-type compressors have been used in various applications, including refrigeration, in the chemical industry, such systems generally employ steam as the drive or motive gas. See, e.g. *Perry's Chemical Engineers' Handbook,* Perry Chilton, and Kirkpatrick, McGraw-Hill, New York, 1963, pages 6–29 through 6–32; and, *Chemical Process Principles,* Hougen, Watson and Ragatz, John Wiley & Sons, New York, 1966, pages 715 through 722. However, the Applicant believes that it has not heretofore been proposed to employ ejector-type compressors in temperature control, such as refrigeration and heating systems utilizing a refrigerant capable of satisfying operations in both a cooling, heating and drive capacity at the temperatures generally provided by solar energy collection and storage apparatus and/or other relatively low temperature heat energy sources, such as provided by combustion and waste heat processes. Further, the Applicant knows of no ejector-type temperature control system, including refrigeration systems and heating systems, which include a cooling jacket around the ejector and a blower for selectively augmenting the suction induced in the ejector and thereby reducing the drive capacity required by the ejector.

For purposes of disclosure, copies of each of the references and patents cited above are submitted herewith.

DESCRIPTION OF THE PREFERRED EMBODIMENTS

The term "temperature conditioning system" as used herein is to be understood to mean a system that absorbs (cooling) and/or rejects (heating) heat energy at a range of desired design temperatures.

Figure 1:
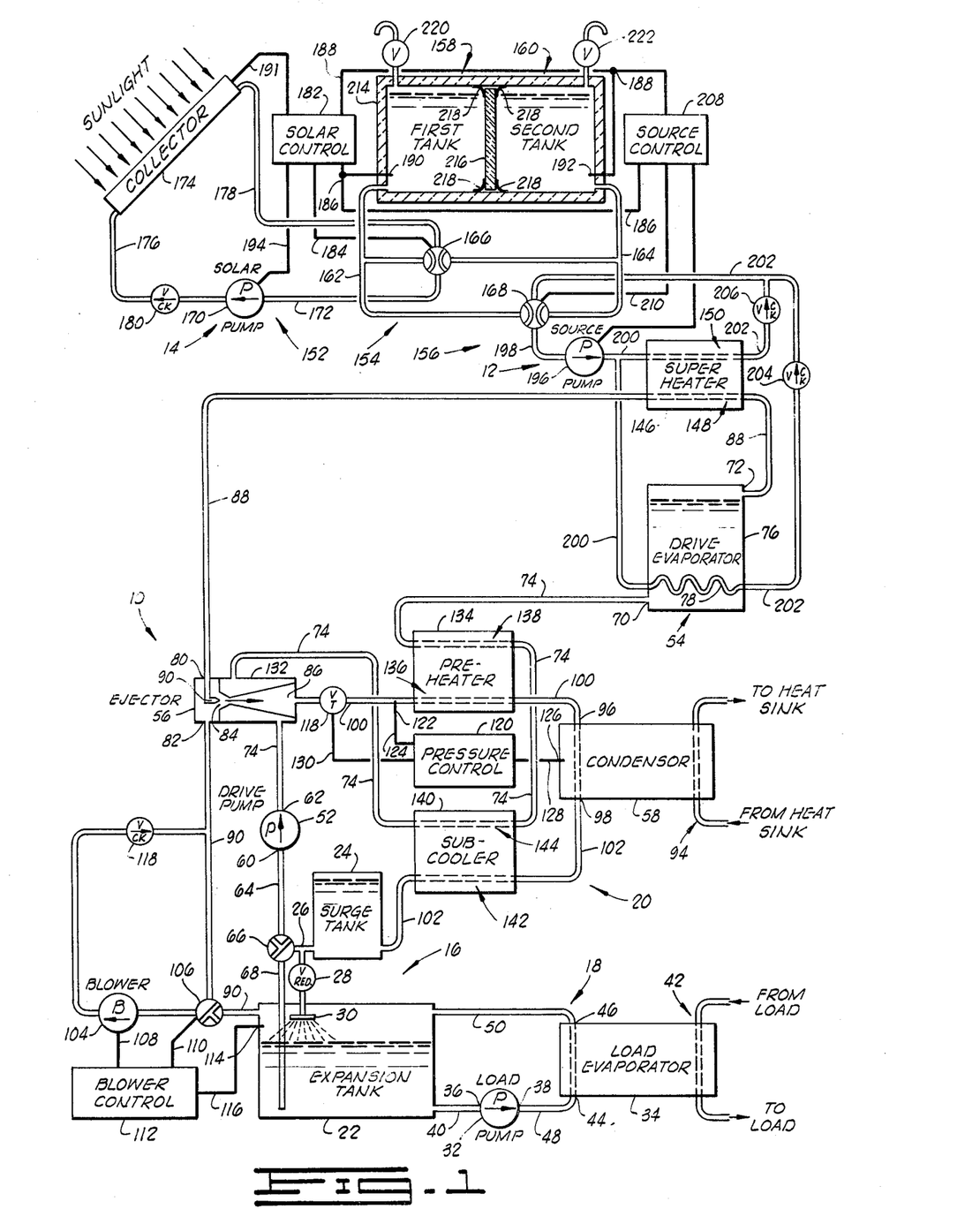
FIG. 1 illustrates in schematic form a temperature conditioning system constructed in accordance with one embodiment of the present invention.

Referring now to the drawings, wherein similar elements or parts are designated by the same numeral, and particularly to FIG. 1, a temperature conditioning system 10, such as a refrigeration and/or heating system, is designed to operate in conjunction with a limited temperature heat source 12, such as a solar energy collection and storage apparatus 14.

Although the temperature conditioning system 10 is capable of satisfactory operation with other types of heat sources, the solar energy collection and storage apparatus 14 is particularly constructed to provide substantially optimum temperature levels commensurate with the energy collection capacity thereof.

In general, the temperature conditioning system 10 is comprised of a refrigerant storage portion 16, a refrigeration loop 18, and a compression loop 20. In the refrigerant storage portion 16, an expansion tank 22 contains a mass of refrigerant at a relatively low temperature and pressure, which is separated into a liquid phase and a gaseous phase. In the preferred form, additional liquid refrigerant at a relatively higher pressure is contained in a surge tank 24. As required, liquid refrigerant is drawn from the surge tank 24 via a conduit 26 into the expansion tank 22 via a reducing valve 28. If desired, a sprayer 30 may be provided in the expansion tank 22 to facilitate efficient transfer of the liquid refrigerant.

The refrigeration loop 18 is comprised primarily of a load pump 32 and a load evaporator 34. The load pump 32 has an inlet portion 36 and an outlet portion 38, the inlet portion 36 being connected via a conduit 40 to the portion of the expansion tank 22 containing the liquid refrigerant. In the preferred form, the load pump 32 may be any of a number of commercially available, relatively low pressure fluid circulation type pumps.

The load evaporator 34, which is connected in a heat exchanging relationship with a refrigeration load via a circulation path 42, has an inlet portion 44 and an outlet portion 46, the inlet portion 44 being connected via a conduit 48 to the outlet portion 38 of the load pump 32, and the outlet portion 46 being connected via a conduit 50 to the expansion tank 22. The load evaporator 34 operates in a conventional manner to extract heat from the refrigeration load when the system is operating in the cooling mode (such as air inside a building) or to supply heat to the refrigeration load, in the heating mode (such as outside air), through a phase change in the refrigerant supplied by the load pump 32. In the preferred form, the load evaporator 34 may be any of a number of commercially available heat exchangers.

The compression loop 20 is comprised primarily of a drive pump 52, a drive evaporator 54, an ejector 56, and a condenser 58. In the cooling mode of the system the condenser 58 rejects heat to a cooling source, such as cooling water or the air outside of a building, and in the heating mode of the system the condenser 58 provides heat for a heat sink, such as the air inside of a building. The drive pump 52 has an inlet portion 60 and an outlet portion 62, the inlet portion 60 being connected via a conduit 64 to a portion of the refrigerant storage portion 16 containing the liquid refrigerant. Although it will normally be preferred to connect the conduit 64 directly to the conduit 26 from the surge tank 24, a three-way valve 66 may be provided if desired to selectively couple the conduit 64 either to the conduit 26 from the surge tank 24, or to a conduit 68 in fluid communication with the liquid refrigerant in the expansion tank 22, or both. The valve 66 permits the relative amounts of the liquid refrigerant being drawn from the expansion tank 22 and the surge tank 24 into the drive pump 52 to be selectively adjusted depending upon operating conditions. In the preferred form, the drive pump 52 may be any of a number of commercially available, relatively high pressure fluid type pumps.

The drive evaporator 54, which is connected in a heat exchanging relationship with the heat source 12, has an inlet portion 70 and an outlet portion 72, the inlet portion 70 being connected via a conduit 74 to the outlet portion 62 of the drive pump 52. In the drive evaporator 54, heat provided by the heat source 12 is transferred to the liquid refrigerant provided by the drive pump 52, the resultant heat gain causing a substantial portion of the liquid refrigerant to evaporate and form a mass of relatively high temperature and pressure, gaseous refrigerant available for discharge via the outlet portion 72 thereof. In the preferred form, the drive evaporator 54 is comprised of a pressure vessel 76 in which the liquid refrigerant supplied thereto by the drive pump 52 via the conduit 74 may separate conveniently into respective liquid and gaseous phases. In this form, heat from the heat source 12 may be transferred to the refrigerant by circulating an appropriate heat transfer medium through a transfer coil 78 disposed therein or otherwise in heat exchanging contact with, the vessel 76 and the liquid refrigerant contained therein.

The ejector 56 has a drive inlet portion 80, a suction inlet portion 82, a mixing portion 84 in fluid communication with the drive and suction inlet portions 80 and 82, respectively, and a diffuser portion 86 in fluid communication with the mixing portion 84. More particularly, the drive inlet portion 80 is connected via a conduit 88 to the outlet portion 72 of the drive evaporator 54, and the suction inlet portion 82 is connected via a conduit 90 to the portion of the expansion tank 22 containing the gaseous refrigerant. The ejector 56, sometimes referred to in the art as a jet pump or jet compressor, operates in a well known manner to compress the relatively low temperature and pressure gaseous refrigerant drawn into the mixing portion 84 from the expansion tank 22 via the conduit 90, using the mechanical energy made available through the ejection via a nozzle 92 of a high velocity stream of the relatively high temperature and pressure refrigerant driven from the drive evaporator 54 via the conduit 88. Upon entry of the mixed stream of refrigerant into the diffuser portion 86, a substantial portion of the velocity energy is reconverted into pressure energy, so that the stream of refrigerant exiting from the diffuser portion 86 has a temperature and a pressure intermediate the respective temperatures and pressures of the refrigerant drawn from the expansion tank 22 and the refrigerant driven from the drive evaporator 54. In the preferred form, the ejector 56 may be selected from commercially available units.

The condensor 58, which is connected in a heat exchanging relationship with a heat sink via a circulation path 94, has an inlet portion 96 and an outlet portion 98, the inlet portion 96 being connected via a conduit 100 to the diffuser portion 86 of the ejector 56, and the outlet portion 98 being connected via a conduit 102 to the surge tank 24 of the refrigerant storage portion 16. In the condensor 58, heat from the refrigerant driven from the ejector 56 via the conduit 100 is transferred to the heat sink so that condensed liquid refrigerant is supplied via the conduit 102 to the refrigerant storage portion 16 at the intermediate pressure, but at a relatively low temperature. In the preferred form, the condensor 58 may be any of a number of commercially available heat exchangers.

In the form shown in FIG. 1 of the drawings, a blower 104 is connected between the suction inlet portion 82 of the ejector 56 and the portion of the expansion tank 22 containing the gaseous refrigerant. The blower 104 and a conventional three-way valve 106 interposed in the conduit 90 are each connected via respective signal paths 108 and 110 to a blower control 112. The blower control 112 has a pressure transducer 114 connected thereto via a signal path 116 which is responsive to the pressure in the portion of the expansion tank 22 containing the gaseous refrigerant. The blower control 112 is constructed in a conventional manner to actuate the blower 104 and the valve 106 when the pressure in the expansion tank 22 exceeds a predetermined pressure. Thus, in the event that the suction induced via the operation of the ejector 56 is insufficient to handle the mass of refrigerant generated by the load evaporator 34, the blower 104 will be actuated to boost the flow of gaseous refrigerant into the suction inlet portion 82 to ease the load imposed on the ejector 56. As will be clear to those skilled in the art, more rapid evacuation of gaseous refrigerant from the expansion tank 22 tends to lower the temperature of the remaining refrigerant thus improving the cooling and dehumidifying capacity of the load evaporator 34. The blower 104 may be any of a number of commercially available single-speed, multiple-speed, or variable speed blowers. In the multiple or variable speed form, the operation of the blower 104 may be selectively controlled via the blower control 112 to vary the drive mass and temperature requirements imposed on the drive evaporator 54. Thus, for example, the blower 104 may be partially or totally disengaged when the drive evaporator 54 alone is providing sufficient drive mass and temperature, but fully engaged to provide substantially all of the required compression when the drive evaporator 54 is unable to provide significant drive. If desired, a conventional check valve 118 may be interposed between the blower 104 and the conduit 90 to prevent back pressure on the blower 104.

To insure that the mass of gaseous refrigerant flowing from the ejector 56 can be condensed in the condensor 58, the pressure in the condensor 58 should be maintained below the selected refrigerant's characteristic equilibrium pressure at the operating temperature of the condensor 58. Accordingly, a preferred embodiment includes a throttle valve 118 interposed in the conduit 100 generally between the diffuser portion 86 of the ejector 56 and the inlet portion 96 of the condensor 58; and a pressure control 120 having a pressure transducer 122 connected thereto via a signal path 124 and a temperature transducer 126 connected thereto via a signal path 128. The pressure transducer 122 is connected in a conventional manner to the conduit 100 so as to be responsive to the pressure of the gaseous refrigerant flowing in the conduit 100 between the diffuser portion 86 of the ejector 56 and the inlet portion 96 of the condensor 58. The temperature transducer 126 is connected in a conventional manner to the condensor 58 so as to be responsive to the temperature of the condensor 58 during the operation thereof. The pressure control 120 is preferably programmed using conventional techniques to regulate the operating condition throttle valve 118 via a signal path 130 so that the pressure of the gaseous refrigerant flowing into the condensor 58 is slightly less than or equal to the equilibrium vapor pressure at the current operating temperature. As will be clear to those skilled in the art, the predetermined relationship between temperature and pressure known in the art as the vapor equilibrium curve may be obtained from the thermodynamic properties chart for the selected refrigerant.

In determining the performance of ejector-type compressors, such as the ejector 56, it is well recognized that a siginigicant improvement can be realized by cooling the diffuser portion 86 of the ejector 56 during the operation thereof. Since the temperature of the liquid refrigerant flowing in the conduit 74 from the drive pump 52 to the drive evaporator 54 will normally be lower than the temperature of the mixed stream of gaseous refrigerant flowing from the diffuser portion 86 into the conduit 100, a transfer of heat from the diffuser portion 86 to the stream of liquid refrigerant not only provides the desired cooling of the diffuser portion 86, but also contributes usable heat to the liquid refrigerant to reduce the load on the drive evaporator 54. In a preferred form, this heat transfer is accomplished using a cooling jacket 132 connected in heat exchanging relationship with at least a portion of the diffuser portion 86 of the ejector 56, the cooling jacket 132 being interposed in the conduit 74 generally between the outlet portion 62 of the drive pump 52 and the inlet portion 70 of the drive evaporator 54. In this form, heat is conveniently transferred from the diffuser portion 86 to the liquid refrigerant flowing in the conduit 74 to the drive evaporator 54.

It has been determined that a substantial reduction in the heat output capacity of the heat source 12 can be realized by preheating the liquid refrigerant provided by the drive pump 52 before introduction into the drive evaporator 54. A corresponding reduction in the operating capacity of the condensor 58 will result if the source of heat for the preheating of the liquid refrigerant is the gaseous refrigerant flowing from the ejector 56 into the condensor 58. In the preferred form, this dual goal is accomplished using a preheater 134 comprising a heat source portion 136 connected in a heat exchanging relationship with a heat sink portion 138 thereof. The heat source portion 136 is interposed in the conduit 100 generally between the diffuser portion 86 of the ejector 56 and the inlet portion 96 of the condensor 58, while the heat sink portion 138 is interposed in the conduit 74 generally between the outlet portion 62 of the drive pump 52 and the inlet portion 70 of the drive evaporator 54. In this form, the preheater 134, which may be any of a number of commercially available types, conveniently converts the excess heat of the gaseous refrigerant flowing in the conduit 100 into usable heat in the liquid refrigerant flowing in the conduit 74.

In general, introduction of liquid refrigerant from the surge tank 24 into the expansion tank 22 via the reducing valve 28 will result in the spontaneous vaporization of a portion of the liquid refrigerant. The vapor so generated not only represents a reduction in the liquid refrigerant available for use in the load evaporator 34, but, more significantly, increases the mass of gaseous refrigerant that must be removed and compressed by the ejector 56. One method for minimizing this spontaneous vaporization is to reduce the temperature of the liquid refrigerant in the surge tank 24. Normally, the liquid refrigerant being supplied by the drive pump 52 via the conduit 74 will have a temperature below that of the refrigerant flowing in the conduit 102 from the condensor 48 into the surge tank 24. Therefore, a transfer of heat between these streams conveniently accomplishes a temperature reduction in the liquid refrigerant flowing into the refrigerant storage portion 16, while simultaneously contributing heat to the liquid refrigerant flowing to the drive evaporator 54 to minimize the load on the latter. In the preferred form, this dual goal is accomplished using a subcooler 140 comprising a heat source portion 142 connected in a heat exchanging relationship with a heat sink portion 144 thereof. The heat source portion 142 is interposed in the conduit 102 generally between the outlet portion 98 of the condensor 58 and the surge tank 24 of the refrigerant storage portion 16, while the heat sink portion 144 is interposed in the conduit 74 generally between the outlet portion 62 of the drive pump 52 and the inlet portion 70 of the drive evaporator 54. In this form, the subcooler 140, which may be any of a number of commercially available types, conveniently reduces the temperature differential between the liquid refrigerant in the surge tank 24 relative to the refrigerant in the expansion tank 22, while contributing usable heat to the liquid refrigerant flowing in the conduit 74.

Further improvements in the performance of the ejector 56 can be realized by increasing the pressure or temperature of the gaseous refrigerant entering the drive inlet portion 80 via the conduit 88 relative to the pressure and temperature of the gaseous refrigerant entering the suction inlet portion 82 via the conduit 90. Although an increase in the pressure differential will generally necessitate an increase in the size and power consumption of the drive pump 52, an increase in the temperature differential may be conveniently accomplished by adding additional heat provided by a heat source, such as the heat source 12, directly to the gaseous refrigerant being driven via the conduit 88 from the drive evaporator 54 into the drive inlet portion 80 of the ejector 56. In the preferred form, the desired temperature increase is accomplished using a superheater 146 comprising a heat sink portion 148 connected in a heat exchanging relationship with the heat primary source 12 via a heat source portion 150 thereof. The heat sink portion 148 is interposed in the conduit 88 generally between the outlet portion 72 of the drive evaporator 54 and the drive inlet portion 80 of the ejector 56, while the heat source portion 150 is constructed to allow circulation therethrough of an appropriate heat transfer medium provided by the heat source 12 for subsequent return thereto. In this form, the superheater 146, which may be any of a number of commercially available types, facilitates direct transfer of heat provided by the heat source 12 to the gaseous refrigerant flowing in the conduit 88 from the drive evaporator 54 into the ejector 56.

The solar energy collection and storage apparatus 14 is comprised primarily of a heat collection portion 152, a heat storage portion 156, and a heat utilization portion 158 functioning as the heat source 12 referred to above. In general, energy in the form of sunlight is collected by the primary heat collection portion 152 and transferred to a heat transfer fluid for storage in the heat storage portion 154. Thereafter, the heat energy may be transferred to the heat utilization portion 156 via the heat transfer fluid.

In many applications, and particularly in the refrigeration system 10, the performance of the system is dependent not so much on the quantity of heat provided by the heat utilization portion 156, but rather the temperature at which the heat is made available. On the other hand, it can be shown that heat transfer fluid at a higher average temperature can be supplied to the heat utilization portion 156 if the heat transfer fluid being discharged from the heat utilization portion 156 is never mixed directly with the heat transfer fluid being supplied to the heat utilization portion 146. Accordingly, the heat storage portion 154, in the preferred form, is comprised of first and second insulated, heat transfer fluid storage tanks 158 and 160, respectively. From the first and second storage tanks 158 and 160, conduits 162 and 164 provide fluid communication to first and second flow control valves 166 and 168, respectively.

In the heat collection portion 152, heat transfer fluid is drawn through the first flow control valve 166 by a solar pump 170 via a conduit 172 for supply to a solar collector array 174 via a conduit 176. From the solar collector array 174, heated transfer fluid is returned to the first flow control valve 166 via a conduit 178. If desired, a conventional check valve 180 may be interposed in the conduit 176 to prevent backflow through the solar pump 170. In the preferred form, the first flow control valve 166 is a conventional 4-way, electrically actuated valve, while the solar pump 170 is any of a number of commercially available fluid circulation type pumps.

A solar control 182, responsive to the temperature of the heat transfer fluid in each of the first and second storage tanks 158 and 160, respectively, controls the first flow control valve 166 to provide flow of the heat transfer medium between the heat storage portion 154 and the heat collection portion 152. More particularly, the solar control 182 is connected via signal paths 186 and 188 to first and second temperature sensors 190 and 192, respectively, which are connected to, and in contact with the heat transfer fluid in, the first and second storage tanks 158 and 160, respectively. Conditioned upon the temperature differential as measured by the first and second temperature sensors 190 and 192, the solar control 182 will actuate the first flow control valve 166 to provide flow of the heat transfer medium from the one of the first and second storage tanks 158 and 160, respectively, containing the lower temperature heat transfer fluid for return to the other of said tanks. Thus, heat transfer fluid from the storage tank containing the lower temperature heat transfer fluid will be supplied to the solar pump 170 for circulation through the solar collector array 174 for return to the storage tank containing the lower temperature heat transfer fluid. During the transition of the first flow control valve 166, or when the temperature of the solar collector array 174 as sensed via a signal path 191 is below a predetermined minimum, the solar control 182 may deactuate the solar pump 170 via a signal path 194.

In the heat utilization portion 156, heat transfer fluid is drawn through the second flow control valve 168 by a source pump 196 via a conduit 198 for supply via a conduit 200 to the drive evaporator 54 and, if provided, the superheater 146. From the drive evaporator 54, and superheater 146, if provided, the reduced temperature heat transfer fluid is returned to the second flow control valve 168 via a conduit 202. If desired, conventional check valves 204 and 206 may be interposed in the conduit 202 to prevent backflow through the drive evaporator 54 and superheater 146, respectively. In the preferred form, the second flow control valve 168 is a conventional 4-way, electrically actuated valve, while the source pump 196 is any of a number of commercially available fluid circulation type pumps.

A source control 208, responsive to the temperature of the heat transfer fluid in each of the first and second storage tanks 158 and 160, respectively, controls the second flow control valve 168 via a signal path 210 to provide flow of the heat transfer medium between the heat storage portion 154 and the heat utilization portion 156. More particularly, the source control 208 is connected via the signal paths 186 and 188 to the first and second temperature sensors 190 and 192, respectively. Conditioned upon the temperature differential as measured by the first and second temperature sensors 190 and 192, the source control 208 will actuate the second flow control valve 168 to provide flow of the heat transfer medium from the one of the first and second storage tanks 158 and 160, respectively, containing the higher temperature heat transfer fluid for return to the other of said tanks. Thus, heat transfer fluid from the storage tank containing the higher temperature heat transfer fluid will be supplied to the source pump 196 for circulation through the drive evaporator 54, and the superheater 146, if provided, for return to the storage tank containing the lower temperature heat transfer fluid. During the transition of the second flow control valve 168, or if the temperature in both the first and second tanks 158 and 160, respectively, falls below a predetermined minimum, the source control 108 may deactuate the source pump 196 via a signal path 212.

Although the first and second storage tanks 158 and 160, respectively, may have fixed capacity sufficient to accomodate a substantial portion of the total heat transfer fluid contained in the solar energy collection and storage apparatus 14, significant savings in space and materials can be realized if said tanks form respective end portions of an elongated heat transfer fluid reservoir 214 having a substantially fluid impermeable insulating barrier 216 interposed between said end portions, but in relative sealing engagement with the inner periphery thereof, as by seals 218. In this form, the barrier 216 will be movable along the length of the reservoir 214 generally between the end portions, in response to differences in fluid pressures exerted thereon, thereby proportionally changing the capacities of the first and second storage tanks 158 and 160, respectively. When the barrier 216 has reached a maximal position adjacent one of the ends of the reservoir 214, the fluid level in that end will drop rapidly thereby exposing the respective temperature sensor 190 or 192. Upon detecting the resultant temperature drop, the solar and source controls 182 and 208, respectively, will actuate the first and second flow control valves 166 and 168, respectively, to reverse the direction of flow back into the emptied end portion. If desired, conventional temperature and pressure relief valves 220 and 222 may be provided to selectively vent the end portions of the fluid reservoir 214.

Figure 2:
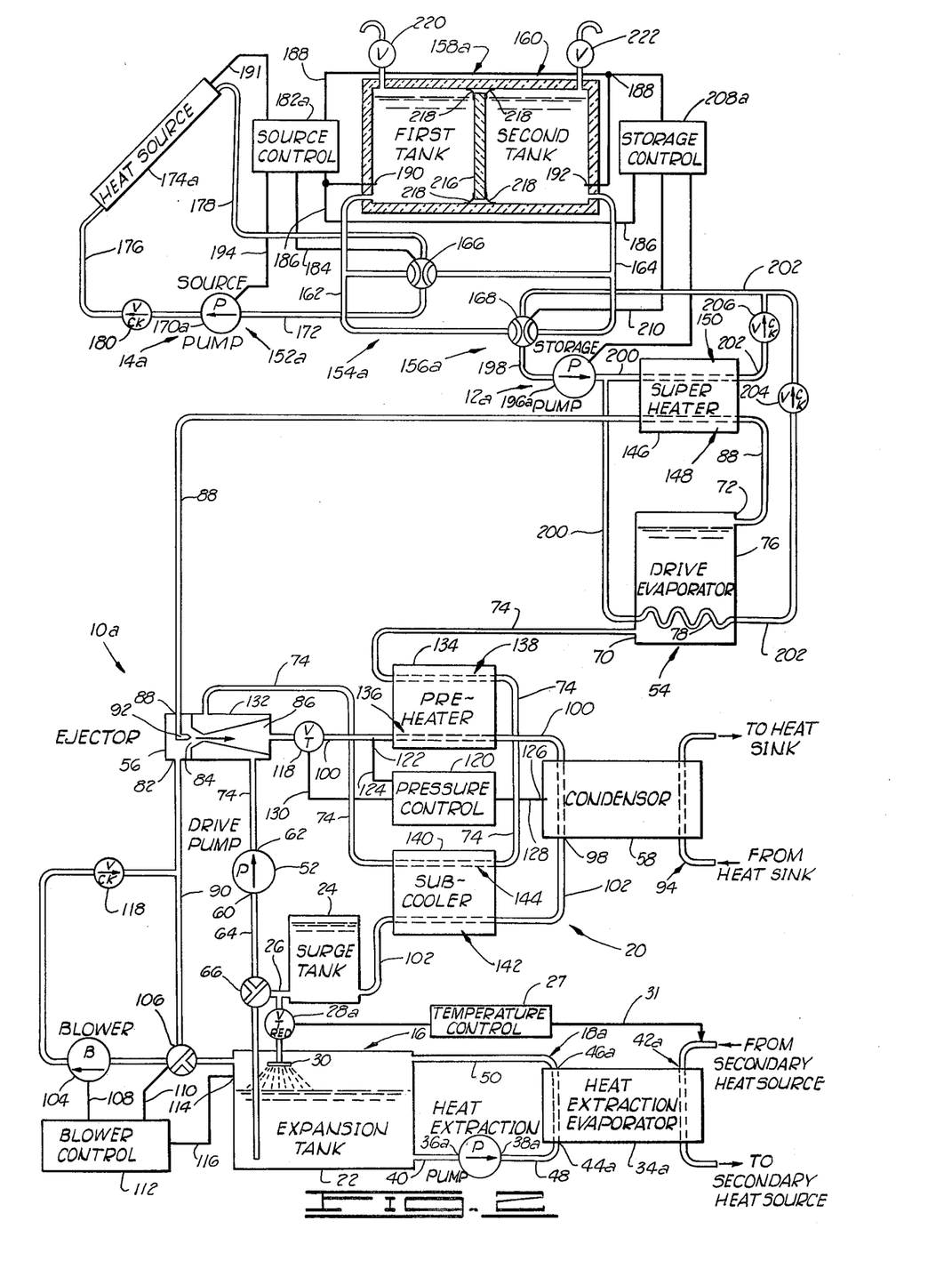
FIG. 2 illustrates in schematic form a temperature conditioning system constructed in accordance with a second embodiment of the present invention.

Referring now to FIG. 2, a second embodiment of a temperature conditioning system 10a, is designed to operate in conjunction with a limited temperature primary heat source 12a such as a heat energy collection and storage apparatus 14a for collecting and storing energy from a low temperature heat source, such as energy derived from combustion processes using fossil fuels, garbage, manure, and the like, as well as solar energy. Although the temperature control system 10a is capable of satisfactory operation with other types of heat sources, low temperature combustion and waste heat processes or solar energy enable the heat energy collection and storage apparatus 14a to provide substantially optimum temperature levels commensurate with the energy input thereof.

In general, the temperature conditioning system 10a, which can effectively function as a refrigeration and/or heating system, is comprised of a refrigerant storage portion 16, a heat extraction loop 18a, and a compression loop 20. In the refrigerant storage portion 16, an expansion tank 22 contains a mass of refrigerant at a relatively low temperature and pressure, which is separated into a liquid phase and a gaseous phase. In one form, additional liquid refrigerant at a relatively high pressure is contained in a surge tank 24. As required, liquid refrigerant is withdrawn from the surge tank 24 via the conduit 26 into the expansion tank 22 via a pressure reducing valve or expansion valve 28a. The pressure reducing valve or expansion valve 28a is operatively controlled by a temperature control 27 which is operatively connected to a temperature transducer (not shown) in a secondary heat source 42a via a signal control path 31. The temperature control 27 is programmed by conventional techniques to insure that the temperature in the expansion tank 22 is maintained below the temperature of the secondary heat source 42a (when the temperature of the source is significantly varying such as air outside a building) by the operation of the pressure reducing or expansion valve 28a. If desired, a sprayer 30 may be provided in the expansion tank 22 to facilitate efficient transfer of the refrigerant.

The heat extraction loop 18a is comprised primarily of a heat extraction pump 32a and a heat extraction evaporator 34a. The heat extraction pump 32a has an inlet portion 36a and an outlet portion 38a, the inlet portion 36a being connected via a conduit 40 to the portion of the expansion tank 22 containing the liquid refrigerant. The heat extraction pump 32a may be any of a number of commercially available, relatively low pressure fluid circulation type pumps.

The heat extraction evaporator 34a, which is connected in a heat exchanging relationship with a secondary heat source via a circulation path 42a, (a refrigeration load when the system is operating in the cooling mode and an external source of heat, such as outside air when the system is operating in the heating mode) has an inlet portion 44a and an outlet portion 46a, the inlet portion 46a being connected via a conduit 48 to the outlet portion 38a of the heat extraction pump 32a, and the outlet portion 46a being connected via a conduit 50 to the expansion tank 22. The heat extraction evaporator 34a operates in a conventional manner in a cooling mode (such as air inside a building) or from a secondary heat source (such as outside air) in a heating mode through a phase change of the refrigerant supplied by the heat extraction pump 32a. The heat extraction evaporator 34a may be any of a number of commercially available heat exchangers.

The compression loop 20 is comprised primarily of a drive pump 52, and a drive evaporator 54, and a ejector 56, and a condenser 58. In the cooling mode the condensor 58 rejects heat to a cooling source, such as cooling water or air outside a building, and in the heating mode, the condenser 58 provides heat for a heat sink, such as the air inside the building. The drive pump 52 has an inlet portion 60 and an outlet portion 62, the inlet portion 60 being connected via a conduit 64 to a portion of a refrigerant storage portion 16 containing the liquid refrigerant. Although it will normally be preferred to connect the conduit 64 directly to the conduit 26 from the surge tank 24, a three-way valve 66 may be provided if desired to selectively couple the conduit 64 either to the conduit 26 from the surge tank 24, or to a conduit 68 in fluid communication with the liquid refrigerant in the expansion tank 22, or both. The valve 66 permits the relative amounts of the liquid refrigerant being drawn from the expansion tank 22 and the surge tank 24 into the drive pump 52 to be selectively adjusted depending upon operating conditions. In the preferred form, the drive pump 52 may be any of a number of commercially available, relatively high pressure fluid type pumps.

The drive evaporator 54, which is connected in a heat exchange relationship with the primary heat source 12a, has an inlet portion 70 being connected via a conduit 74 to the outlet portion 62 of the drive pump 52. In the drive evaporator 54, heat provided by the primary heat source 12a is transferred to the liquid refrigerant provided by the drive pump 52, the resulted heat gain causing a substantial portion of the liquid refrigerant to evaporate and form a mass of relatively high temperature and pressure, gaseous refrigerant available for discharge via the outlet portion 72 thereof. As depicted, the drive evaporator 54 comprises a pressure vessel 76 in which the liquid refrigerant supplied thereto via the conduit 74 may separate conveniently into respective liquid and gaseous phases. Thus, heat from the primary heat source 12a may be transferred to the refrigerant by circulating an appropriate heat transfer medium through a transfer coil 78 disposed in the vessel 76, or otherwise in heat exchanging contact with the vessel 76 and the liquid refrigerant contained therein.

The ejector 56 has a drive inlet portion 80, a suction inlet portion 82, a mixing portion 84 in fluid communication with the drive and suction inlet portions 80 and 82, respectively, and a diffuser portion 86 in fluid communication with the mixing portion 84. More particularly, the drive inlet portion 80 is connected via a conduit 88 to the outlet portion 72 of the drive evaporator 54, and the suction inlet portion 82 is connected via a conduit 90 to the portion of the expansion tank 22 containing the gaseous refrigerant. The ejector 56, sometimes referred to in the art as a jet pump or jet compressor, operates in a well known manner to compress the relatively low temperature and pressure gaseous refrigerant drawn into the mixing portion 84 from the expansion tank 22 via the conduit 90, using the mechanical energy made available through the ejection via a nozzle 92 of a high velocity stream of the relatively high temperature and pressure refrigerant driven from the drive evaporator 54 via the conduit 88. Upon entry of the mixed stream of refrigerant into the diffuser portion 86, a substantial portion of the velocity energy is reconverted into pressure energy, so that the stream of refrigerant exiting from the diffuser portion 86 has a temperature and a pressure intermediate the respective temperatures and pressures of the refrigerant drawn from the expansion tank 22 and the refrigerant driven from the drive evaporator 54. In the preferred form, the ejector 56 may be selected from commercially available units.

The condensor 58, which is connected in a heat exchanging relationship with a heat sink via a circulation path 94, has an inlet portion 96 and an outlet portion 98, the inlet portion 96 being connected via a conduit 100 to the diffuser portion 86 of the ejector 56, and the outlet portion 98 being connected via a conduit 102 to the surge tank 24 of the refrigerant storage portion 16. In the condensor 58, heat from the refrigerant driven from the ejector 56 via the conduit 100 is transferred to the heat sink so that condensed liquid refrigerant is supplied via the conduit 102 to the refrigerant storage portion 16 at the intermediate pressure, but at a relatively low temperature. In the preferred form, the condensor 58 may be any of a number of commercially available heat exchangers.

In the preferred form shown in the drawing, a blower 104 is connected between the suction inlet portion 82 of the ejector 56 and the portion of the expansion tank 22 containing the gaseous refrigerant. The blower 104 and a conventional three-way valve 106 interposed in the conduit 90 are each connected via respective signal paths 108 and 110 to a blower control 112. The blower control 112 has a pressure transducer 114 connected thereto via a signal path 116 which is responsive to the pressure in the portion of the expansion tank 22 containing the gaseous refrigerant. The blower control 112 is constructed in a conventional manner to actuate the blower 104 and the valve 106 when the pressure in the expansion tank 22 exceeds a predetermined pressure.

Thus, in the event that the suction induced via the operation of the ejector 56 is insufficient to handle the mass of refrigerant generated by the heat extraction evaporator 34a, the blower 104 will be actuated to boost the flow of gaseous refrigerant into the suction inlet portion 82 to ease the load imposed on the ejector 56. As will be clear to those skilled in the art, more rapid evacuation of gaseous refrigerant from the expansion tank 22 tends to lower the temperature of the remaining refrigerant thus improving the cooling and dehumidifying capacity of the heat extraction evaporator 34a. In the preferred form, the blower 104 may be any of a number of commercially available single-speed, multiple-speed, or variable speed blowers. In the multiple or variable speed form, the operation of the blower 104 may be selectively controlled via the blower control 112 to vary the drive mass and temperature requirements imposed on the drive evaporator 54. Thus, for example, the blower 104 may be partially or totally disengaged when the drive evaporator 54 alone is providing sufficient drive mass and temperature, but fully engaged to provide substantially all of the required compression when the drive evaporator 54 is unable to provide significant drive. If desired, a conventional check valve 118 may be interposed between the blower 104 and the conduit 90 to prevent back pressure on the blower 104.

To insure that the mass of gaseous refrigerant flowing from the ejector 56 can be condensed in the condensor 58, the pressure in the condensor 58 should be maintained below the selected refrigerant's characteristic equilibrium pressure at the operating temperature of the condensor 58. Accordingly, a preferred embodiment includes a throttle valve 118 interposed in the conduit 100 generally between the diffuser portion 86 of the ejector 56 and the inlet portion 96 of the condensor 58; and a pressure control 120 having a pressure transducer 122 connected thereto via a signal path 124 and a temperature transducer 126 connected thereto via a signal path 128. The pressure transducer 122 is connected in a conventional manner to the conduit 100 so as to be responsive to the pressure of the gaseous refrigerant flowing in the conduit 100 between the diffuser portion 86 of the ejector 56 and the inlet portion 96 of the condensor 58. The temperature transducer 126 is connected in a conventional manner to the condensor 58 so as to be responsive to the temperature of the condensor 58 during the operation thereof. The pressure control 120 is preferably programmed using conventional techniques to regulate the operating condition throttle valve 118 via a signal path 130 so that the pressure of the gaseous refrigerant flowing into the condensor 58 is slightly less than or equal to the equilibrium vapor pressure at the current operating temperature. As will be clear to those skilled in the art, the predetermined relationship between temperature and pressure known in the art as the vapor equilibrium curve may be obtained from the thermodynamic properties chart for the selected refrigerant.

In determining the performance of ejector-type compressors, such as the ejector 56, it is well recognized that a significant improvement can be realized by cooling the diffuser portion 86 of the ejector 56 during the operation thereof. Since the temperature of the liquid refrigerant flowing in the conduit 74 from the drive pump 52 to the drive evaporator 54 will normally be lower than the temperature of the mixed stream of gaseous refrigerant flowing from the diffuser portion 86 into the conduit 100, a transfer of heat from the diffuser portion 86 to the stream of liquid refrigerant not only provides the desired cooling of the diffuser portion 86, but also contributes usable heat to the liquid refrigerant to reduce the load on the drive evaporator 54. In the preferred form, this heat transfer is accomplished using a cooling jacket 132 connected in heat exchanging relationship with at least a portion of the diffuser portion 86 of the ejector 56, the cooling jacket 132 being interposed in the conduit 74 generally between the outlet portion 62 of the drive pump 52 and the inlet portion 70 of the drive evaporator 54. In this form, heat is conveniently transferred from the diffuser portion 86 to the liquid refrigerant flowing in the conduit 74 to the drive evaporator 54.

It has been determined that a substantial reduction in the heat output capacity of the primary heat source 12a can be realized by preheating the liquid refrigerant provided by the drive pump 52 before introduction into the drive evaporator 54. A corresponding reduction in the operating capacity of the condensor 58 will result if the source of heat for the preheating of the liquid refrigerant is the gaseous refrigerant flowing from the ejector 56 into the condensor 58. In the preferred form, this dual goal is accomplished using a preheater 134 comprising a heat source portion 136 connected in a heat exchanging relationship with a heat sink portion 138 thereof. The heat source portion 136 is interposed in the conduit 100 generally between the diffuser portion 86 of the ejector 56 and the inlet portion 96 of the condensor 58, while the heat sink portion 138 is interposed in the conduit 74 generally between the outlet portion 62 of the drive pump 52 and the inlet portion 70 of the drive evaporator 54. In this form, the preheater 134, which may be any of a number of commercially available types, conveniently converts the excess heat of the gaseous refrigerant flowing in the conduit 100 into usable heat in the liquid refrigerant flowing in the conduit 74.

In general, introduction of liquid refrigerant from the surge tank 24 into the expansion tank 22 via the pressure reducing valve 28a will result in the spontaneous vaporization of a portion of the liquid refrigerant. The vapor so generated not only represents a reduction in the liquid refrigerant available for use in the heat extraction evaporator 34a, but, more significantly, increases the mass of gaseous refrigerant that must be removed and compressed by the ejector 56. One method for minimizing this spontaneous vaporization is to reduce the temperature of the liquid refrigerant in the surge tank 24. Normally, the liquid refrigerant being supplied by the drive pump 52 via the conduit 74 will have a temperature below that of the refrigerant flowing in the conduit 102 from the condensor 58 into the surge tank 24. Therefore, a transfer of heat between these streams conveniently accomplishes a temperature reduction in the liquid refrigerant flowing into the refrigerant storage portion 16, while simultaneously contributing heat to the liquid refrigerant flowing to the drive evaporator 54 to minimize the load on the latter. In the preferred form, this dual goal is accomplished using a subcooler 140 comprising a heat source portion 142 connected in a heat exchanging relationship with a heat sink portion 144 thereof. The heat source portion 142 is interposed in the conduit 102 generally between the outlet portion 98 of the condenser 58 and the surge tank 24 of the refrigerant storage portion 16, while the heat sink portion 144 is interposed in the conduit 74 generally between the outlet portion 62 of the drive pump 52 and the inlet portion 70 of the drive evaporator 54. In this form, the subcooler 140, which may be any of a number of commercially available types, conveniently reduces the temperature differential between the liquid refrigerant in the surge tank 24 relative to the refrigerant in the expansion tank 22, while contributing usable heat to the liquid refrigerant flowing in the conduit 74.

Further improvements in the performance of the ejector 56 can be realized by increasing the pressure or temperature of the gaseous refrigerant entering the drive inlet portion 80 via the conduit 88 relative to the pressure and temperature of the gaseous refrigerant entering the suction inlet portion 82 via the conduit 90. Although an increase in the pressure differential will generally necessitate an increase in the size and power consumption of the drive pump 52, an increase in the temperature differential may be conveniently accomplished by adding additional heat provided by a heat source, such as the primary heat source 12a, directly to the gaseous refrigerant being driven via the conduit 88 from the drive evaporator 54 into the drive inlet portion 80 of the ejector 56. In the preferred form, the desired temperature increase is accomplished using a superheater 146 comprising a heat sink portion 148 connected in a heat exchanging relationship with the primary heat source 12a via a heat source portion 150 thereof. The heat sink portion 148 is interposed in the conduit 88 generally between the outlet portion 72 of the drive evaporator 54 and the drive inlet portion 80 of the ejector 56, while the heat source portion 150 is constructed to allow circulation therethrough of an appropriate heat transfer medium provided by the primary heat source 12a for subsequent return thereto. In this form, the superheater 146, which may be any of a number of commercially available types, facilitates direct transfer of heat provided by the primary heat source 12a to the gaseous refrigerant flowing in the conduit 88 from the drive evaporator 54 into the ejector 56.

The heat energy collection and storage apparatus 14a and/or relatively low temperature heat source is comprised primarily of a heat generation portion 152a, a heat storage portion 156a, and a heat utilization portion 158a functioning as the primary heat source 12a referred to above. In general, energy in the form of sunlight, combustion or process waste heat energy is generated by the primary heat generation portion 152a and transferred to a heat transfer fluid for storage in the heat storage portion 154a. Thereafter, the heat energy may be transferred to the heat utilization portion 156a via the heat transfer fluid.

In many applications, and particularly in the temperature conditioning system 10a, the performance of the system is dependent not so much on the quantity of heat provided by the heat utilization portion 156a, but rather the temperature at which the heat is made available. On the other hand, it can be shown that heat transfer fluid at a higher average temperature can be supplied to the heat utilization portion 156a if the heat transfer fluid being discharged from the heat utilization portion 156a is never mixed directly with the heat transfer fluid being supplied to the heat utilization portion 146. Accordingly, the heat storage portion 154a, in the preferred form, is comprised of first and second insulated, heat transfer fluid storage tanks 158 and 160, respectively. From the first and second storage tanks 158 and 160, conduits 162 and 164 provide fluid communication to first and second flow control valves 166 and 168, respectively.

In the heat collection portion 152a, heat transfer fluid is drawn through the first flow control valve 166 by a source pump 170a via a conduit 172 for supply to a heat source 174a via a conduit 176. From the heat source 174a, heated transfer fluid is returned to the first flow control valve 166 via a conduit 178. If desired, a conventional check valve 180 may be interposed in the conduit 176 to prevent backflow through the source pump 170a. In the preferred form, the first flow control valve 166 is a conventional 4-way, electrically actuated valve, while the source pump 170a is any of a number of commercially available fluid circulation type pumps.

A heat energy source control 182a, responsive to the temperature of the heat transfer fluid in each of the first and second storage tanks 158 and 160, respectively, controls the first flow control valve 166 to provide flow of the heat transfer medium between the heat storage portion 154a and the heat collection portion 152a. More particularly, the energy source control 182a is connected via signal paths 186 and 188 to first and second temperature sensors 190 and 192, respectively, which are connected to, and in contact with the heat transfer fluid in, the first and second storage tanks 158 and 160, respectively. Conditioned upon the temperature differential as measured by the first and second temperature sensors 190 and 192, the energy source control 182a will actuate the first flow control valve 166 to provide flow of the heat transfer medium from the one of the first and second storage tanks 158 and 160, respectively, containing the lower temperature heat transfer fluid for return to the other of said tanks. Thus, heat transfer fluid from the storage tank containing the lower temperature heat transfer fluid will be supplied to the source pump 170a for circulation through the heat source 174a for return to the storage tank containing the lower temperature heat transfer fluid. During the transition of the first flow control valve 166, or when the temperature of the heat source 174a as sensed via a signal path 191 is below a predetermined minimum, the energy source control 182a may deactuate the source pump 170a via a signal path 194.

In the heat utilization portion 156a, heat transfer fluid is drawn through the second flow control valve 168 by a storage pump 196a via a conduit 198 for supply via a conduit 200 to the drive evaporator 54 and, if provided, the superheater 146. From the drive evaporator 54, and superheater 146, if provided, the reduced temperature heat transfer fluid is returned to the second flow control valve 168 via a conduit 202. If desired, conventional check valves 204 and 206 may be interposed in the conduit 202 to prevent backflow through the drive evaporator 54 and superheater 146, respectively. In the preferred form, the second flow control valve 168 is a conventional 4-way, electrically actuated valve, while the storage pump 196a is any of a number of commercially available fluid circulation type pumps.

A storage control 208a, responsive to the temperature of the heat transfer fluid in each of the first and second storage tanks 158 and 160, respectively, controls the second flow control valve 168 via a signal path 210 to provide flow of the heat transfer medium between the heat storage portion 154a and the heat utilization portion 156a. More particularly, the storage control 208a is connected via the signal paths 186 and 188 to the first and second temperature sensors 190 and 192, respectively. Conditioned upon the temperature differential as measured by the first and second temperature sensors 190 and 192, the storage control 208a will actuate the second flow control valve 168 to provide flow of the heat transfer medium from the one of the first and second storage tanks 158 and 160, respectively, containing the higher temperature heat transfer fluid for return to the other of said tanks. Thus, heat transfer fluid from the storage tank containing the higher temperature heat transfer fluid will be supplied to the storage pump 196a for circulation through the drive evaporator 54, and the superheater 146, if provided, for return to the storage tank containing the lower temperature heat transfer fluid. During the transition of the second flow control valve 168, or if the temperature in both the first and second tanks 158 and 160, respectively, falls below a predetermined minimum, the storage control 208a may deactuate the storage pump 196a via a signal path 212.

Although the first and second storage tanks 158 and 160, respectively, may have fixed capacity sufficient to accomodate a substantial portion of the total heat transfer fluid contained in the heat energy collection and storage apparatus 14a significant savings in space and materials can be realized if said tanks form respective end portions of an elongated heat transfer fluid reservoir 214 having a substantially fluid impermeable insulating barrier 216 interposed between said end portions, but in relative sealing engagement with the inner periphery thereof, as by seals 218. In this form, the barrier 216 will be movable along the length of the reservoir 214 generally between the end portions, in response to differences in fluid pressures exerted thereon, thereby proportionally changing the capacities of the first and second storage tanks 158 and 160, respectively. When the barrier 216 has reached a maximal position adjacent one of the ends of the reservoir 214, the fluid level in that end will drop rapidly thereby exposing the respective temperature sensor 190 or 192. Upon detecting the resultant temperature drop, the source and storage controls 182a and 208a, respectively, will actuate the first and second flow control valves 166 and 168, respectively, to reverse the direction of flow back into the emptied end portion. If desired, conventional temperature and pressure relief valves 220 and 222 may be provided to selectively vent the end portions of the fluid reservoir 214.

Operation of the Preferred Embodiments

In the preferred form of the temperature conditioning system 10 (temperature control system 10), as depicted in FIG. 1, the refrigerant in the expansion tank 22 and throughout the refrigeration loop 18 will generally be subject to pressures greater than or equal to about 2 psia. In contrast, the drive pump 52 may be selected to supply refrigerant to the ejector 56 at a pressure generally between 14.7 and 700 psia. Depending upon the refrigerant selected, the pressure control 120 may be constructed to regulate the throttle valve 118 to maintain the refrigerant pressure between the ejector 56 and the reducing valve 28 between 14.7 and about 700 psia. Depending upon the mode of operation thereof, the blower 104 may be selectively actuated to boost the pressure of the gaseous refrigerant supplied to the suction inlet portion 82 of the ejector 56 from the normal pressure level in the expansion tank 22 and surge tank 24 to between about 2 psia and about 700 psia.

To assure proper operation of the refrigeration loop 18, the temperature of the refrigerant in the expansion tank 22 will be generally less than or equal to the temperature of the load. The liquid refrigerant supplied by the drive pump 52 will normally have the temperature elevated, via the transfer of heat thereto from the relatively high temperature stream flowing between the outlet of ejector 56 and the condensor 58 and from the heat source 12, to between about 80° F. and about 300° F. Between the ejector 56 and the surge tank 24, sufficient heat is preferably removed to lower the temperature of the liquid refrigerant to between about 32° F. and about 160° F. Thus, the heat source 12 is preferably sized to operate at temperatures from about 80° F. to about 300° F., while the heat sink coupled to the condensor 58 via the circulation path 94 preferably provides temperatures from about 32° F. to about 160° F.

In addition to being capable of operating within these preferred temperature and pressure ranges, the selected refrigerant preferably satisfies the following criteria:

1. Non-toxic or mildly toxic, i.e. level 4 to level 6 on the ASHRA scale.
2. Subject to minimal thermal degradation when subject to temperatures less than about 300° F. for extended periods.
3. Less than 10% chemical breakdown per year when subject to temperatures less than about 300° F. for extended periods.
4. Non-corrosive or mildly corrosive to carbon steel or bronze under all normal operating conditions.
5. As large a heat of vaporization at 32° F. as possible, preferably on the order of about 80 Btu/lbm.
6. Absolute pressure of gas phase at 32° F. should be less than atmospheric (14.7 psia).
7. As small a critical temperature and pressure as possible, so long as the critical temperature is greater than about 300° F.
8. Less than 100% vaporization on expansion from temperature and pressure of surge tank 24 to temperature and pressure of expansion tank 22.
9. The saturation pressure for saturated liquid at maximum heat source 12 temperature should be as low as possible to reduce drive pump 52 size and load.
10. The ratio of enthalpies for isentropic expansion from about 300° F. down to about 32° and for isentropic compression from about 32° to the expected maximum heat sink temperature should be as large as possible, to insure that the ejector 56 can compress all of the low temperature gas up to the pressure of the superheated vapor at the heat sink temperature.

Applying the above criteria to the embodiment shown in the drawing, it has been determined that the following commercially available refrigerants are available for consideration in specific operating configurations: Trichloromonofluromethane (R-11), Dichloromonofluromethane (R-21), Trichlorotrifluroethane (R-113), and Dichlorohexafluropropane (R-216). Depending upon the load requirements, as well as the heat source and sink capabilities, these refrigerants can be used singly or in combination, with or without the addition of other refrigerants to establish a stable mass and temperature balance for the refrigeration system 10.

With reference to the solar energy collection and storage apparatus 14, the range of operating temperatures set forth above may be conveniently achieved using any of a number of commercially available focusing-type, parabolic collectors in the solar collector array 174. Furthermore, coolant solutions are readily available to raise the boiling point of the heat transfer fluid, normally water, to about 300° F. Similarly, antifreeze solutions may be added to the heat transfer fluid to preclude freezing at normally occurring temperatures experienced at the solar collector array 174. If desired, conventional drain-down equipment can be provided to further protect against freeze damage.

The term "liquid phase" as used herein means "substantially consisting of liquid", and the term "gas phase" as used herein means "substantially consisting of a gas". The terms "liquid phase" and "gas phase" each include systems using mixed phases of gasses and liquids.

In the preferred form of the temperature conditioning system 10a, as depicted in FIG. 2, the refrigerant in the expansion tank 22 and throughout the heat extraction loop 18a will generally be subject to pressures greater than or equal to about 2 psia. In contrast, the drive pump 52 may be selected to supply refrigerant to the ejector 56 at a pressure generally between 14.7 and 700 psia. Depending upon the refrigerant selected, the pressure control 120 may be constructed to regulate the throttle valve 118 to maintain the refrigerant pressure between the ejector 56 and the pressure reducing valve 28a between 14.7 and about 700 psia. The temperature control 27 is constructed to regulate the pressure reducing valve 28a to maintain refrigerant temperature in the expansion tank at a temperature below the temperature of the secondary heat source. Depending upon the mode of operation thereof, the blower 104 may be selectively actuated to boost the pressure of the gaseous refrigerant supplied to the suction inlet portion 82 of the ejector 56 from the normal pressure level in the expansion tank 22 and surge tank 24 to between about 2 psia and about 700 psia.

To assure proper operation of the heat extraction loop 18a, in both the heating and cooling mode, the temperature of the refrigerant in the expansion tank 22 will be generally below the secondary heat source temperatures, even if the heat source temperature is below 0° F. The liquid refrigerant supplied by the drive pump 52 will normally have the temperature elevated, via the transfer of heat thereto from the relatively high temperature stream flowing between the outlet of ejector 56 and the condensor 58 and from the primary heat source 12a, to between about 80° F. and about 300° F. Between the ejector 56 and the surge tank 24, sufficient heat is preferably removed to lower the temperature of the liquid refrigerant to between about 32° F. and about 160° F. Thus, the primary heat source 12a is preferably sized to operate at temperatures from about 80° F. to about 300° F., while the heat sink coupled to the condensor 58 via the circulation path 94 preferably provides temperatures from about 32° F. to about 160° F.

In addition to being capable of operating within these preferred temperature and pressure ranges, the selected refrigerant preferably satisfies the following criteria:

1. Non-toxic or mildly toxic, i.e. level 4 to level 6 on the ASHRA scale.
2. Subject to minimal thermal degradation when subject to temperatures less than about 300° F. for extended periods.
3. Less than 10% chemical breakdown per year when subject to temperatures less than about 300° F. for extended periods.
4. Non-corrosive or mildly corrosive to carbon steel or bronze under all normal operating conditions.
5. As large a heat of vaporization at 32° F. as possible, preferably on the order of about 80 Btu/lbm.
6. Absolute pressure of gas phase at 32° F. should be less than atmospheric (14.7 psia).
7. As small a critical temperature and pressure as possible, so long as the critical temperature is greater than about 300° F.

8. Less than 100% vaporization on expansion from temperature and pressure of surge tank 24 to temperature and pressure of expansion tank 22.

9. The saturation pressure for saturated liquid at maximum heat source 12 temperature should be as low as possible to reduce drive pump 52 size and load.

10. The ratio of enthalpies for isentropic expansion from about 300° F. down to the expansion tank temperature and for isentropic compression from the expansion tank temperature to the expected maximum heat sink temperature should be as large as possible, to insure that the ejector 56 can compress all of the low temperature gas up to the pressure of the superheated vapor at the heat sink temperature.

Applying the above criteria to the embodiment shown in the drawing, it has been determined that the following commercially available refrigerants are available for consideration in specific operating configurations: Trichloromonofluromethane (R-11), Dichloromonofluromethane (R-21), Trichlorotrifluroethane (R-113), and Dichlorohexafluropropane (R-216). Depending upon the load requirements, as well as the heat source and sink capabilities, these refrigerants can be used singly or in combination, with or without the addition of other refrigerants to establish a stable mass and temperature balance for the refrigeration system 10.

With reference to the heat energy collection and storage apparatus 14a, the range of operating temperatures set forth above may be conveniently achieved using any of a number of commercially available flat plate or focusing-type, parabolic collectors in the heat source 174a. Furthermore, coolant solutions are readily available to raise the boiling point of the heat transfer fluid, normally water, to about 300° F. Similarly, antifreeze solutions may be added to the heat transfer fluid to preclude freezing at normally occurring temperatures experienced at the heat source 174a. If desired, conventional drain-down equipment can be provided to further protect against freeze damage.

Although particular embodiments of temperature conditioning systems 10 and 10a have been disclosed which is capable of providing significant levels of heating and/or cooling when operated in conjunction with a solar energy collection and storage apparatus 14 having an improved two-tank heat storage portion 154, or a heat energy collection and storage apparatus 14a having an improved two-tank heat storage portion 154a, various changes may be made in the construction and arrangement of the parts or elements of the preferred embodiment as disclosed herein without departing from the spirit and scope of the present invention as defined in the following claims:

What is claimed is:

1. A temperature conditioning system comprising:
   refrigeration storage means containing a refrigerant separated into a liquid phase and a gaseous phase;
   a load pump having an inlet portion and an outlet portion, the inlet portion being connected to the portion of the refrigerant storage means containing the liquid refrigerant;
   a load evaporator connected in a heat exchanging relationship with a refrigeration load, the load evaporator having an inlet portion and an outlet portion, the inlet portion being connected to the outlet portion of the load pump and the outlet portion being connected to the refrigerant storage means;
   a drive pump having an inlet portion and an outlet portion, the inlet portion being connected to the portion of the refrigerant storage means containing the liquid refrigerant;
   a drive evaporator connected in a heat exchanging relationship with a heat source, the drive evaporator having an inlet portion and an outlet portion, the inlet portion being connected to the outlet portion of the drive pump;
   an ejector having a drive inlet portion connected to the outlet portion of the drive evaporator, a suction inlet portion connected to the portion of the refrigerant storage means containing the gaseous refrigerant, a mixing portion in fluid communication with the drive and suction inlet portions, and a diffuser portion in fluid communication with the mixing portion; and
   a condensor connected in a heat exchanging relationship with a heat sink, the condensor having an inlet portion and an outlet portion, the inlet portion being connected to the diffuser portion of the ejector and the outlet portion being connected to the refrigerant storage means.

2. The temperature conditioning system of claim 1 wherein the refrigerant storage means comprises:
   an expansion tank containing refrigerant separated into a liquid phase and a gaseous phase.

3. The temperature conditioning system of claim 2 wherein the refrigerant storage means further comprises:
   an expansion valve connected between the outlet portion of the condensor and the expansion tank.

4. The temperature conditioning system of claim 3 wherein the refrigerant storage means further comprises:
   a surge tank containing refrigerant interposed between the outlet portion of the condensor and the expansion valve.

5. The temperature conditioning system of claim 4 wherein the drive pump is further characterized as having the inlet portion thereof connected to the portion of the surge tank containing the liquid phase of the refrigerant.

6. The temperature conditioning system of claim 4 wherein the drive pump is further characterized as having the inlet portion thereof connected to the portion of the expansion tank containing the liquid phase of the refrigerant.

7. The temperature conditioning system of claim 6 defined further to include:
   means interposed between the surge tank, the expansion tank and the inlet to the drive pump for selectively adjusting the relative amounts of liquid refrigerant being drawn from the expansion tank and the surge tank into the drive pump.

8. The temperature conditioning system of claim 1 further comprising:
   a blower connected between the suction inlet portion of the ejector and the portion of the refrigerant storage means containing the gaseous refrigerant; and
   blower control means responsive to the pressure in the portion of the refrigerant storage means containing the gaseous refrigerant, the blower control means actuating the blower in response to a pressure exceeding a predetermined pressure.

9. The temperature conditioning system of claim 1 further comprising:

a pressure control valve interposed between the diffuser portion of the ejector and the inlet portion of the condensor; and pressure control means responsive to the temperature and pressure in the condensor, the pressure control means actuating the pressure control valve to maintain a predetermined relationship between said temperature and pressure.

10. The temperature conditioning system of claim 1 wherein the ejector is further defined to include a cooling jacket connected in heat exchanging relationship with at least a portion of the diffuser portion of said ejector, the cooling jacket being interposed between the drive pump and the inlet portion of the drive evaporator.

11. The temperature conditioning system of claim 1 further comprising:
 a preheater comprising a heat source portion connected in a heat exchanging relationship with a heat sink portion thereof, the heat source portion being interposed between the diffuser portion of the ejector and the inlet portion of the condensor, and the heat sink portion being interposed between the outlet portion of the drive pump and the inlet portion of the drive evaporator.

12. The temperature conditioning system of claim 1 further comprising:
 a subcooler comprising a heat source portion connected in a heat exchanging relationship with a heat sink portion thereof, the heat source portion being interposed between the outlet portion of the condensor and the refrigerant storage means, and the heat sink portion being interposed between the drive pump and the inlet portion of the drive evaporator.

13. The temperature conditioning system of claim 1 further comprising:
 a superheater comprising a heat sink portion connected in a heat exchanging relationship with a heat source, the heat sink portion being interposed between the outlet portion of the drive evaporator and the drive inlet portion of the ejector.

14. The temperature conditioning system of claim 1 wherein the refrigerant is selected from the group consisting of trichloromonoflorometane, dichloromonofluromethane, trichlorotrifluroethane, and dichlorohexafluropropane.

15. The temperature conditioning system of claims 1 or 13 wherein the heat source is a solar energy collection and storage apparatus providing a heat transfer fluid.

16. The temperature conditioning system of claim 15 wherein the solar energy collection and storage includes an improved heat transfer fluid storage system comprising:
 a first insulated, heat transfer fluid storage tank;
 a second insulated, heat transfer fluid storage tank; and
 fluid flow control means responsive to the temperature of the heat transfer fluid in each of the first and second storage tanks, the fluid flow control means providing flow of the heat transfer fluid from the one of the first and second storage tanks containing the higher temperature heat transfer fluid for return to the other of said storage tanks.

17. The temperature conditioning system of claim 16 wherein the first and second storage tanks of the heat transfer fluid storage system are further characterized as forming respective end portions of an elongated heat transfer fluid reservoir having a substantially fluid impermeable, insulating barrier interposed between said end portions and in relative sealing engagement with the inner periphery thereof, the barrier being movable between said ends in response to differences in the fluid pressures exerted thereon.

18. In a heat utilization apparatus employing a storage system and a heat transfer fluid, the storage system comprising:
 a first insulated, heat transfer fluid storage tank;
 a second insulated, heat transfer fluid storage tank; and
 fluid flow control means responsive to the temperature of the heat transfer fluid in each of the first and second storage tanks, the fluid flow control means providing flow of the heat transfer fluid from the one of the first and second storage tanks containing the higher temperature heat transfer fluid to the heat utilization apparatus for return to the other of said storage tanks.

19. The heat utilization apparatus of claim 18 wherein the first and second tanks of the heat transfer fluid storage system are further characterized as forming respective end portions of an elongated heat transfer fluid reservoir having a substantially fluid impermeable, insulating barrier interposed between said end portions and in relative sealing engagement with the inner periphery thereof, the barrier being movable between said ends in response to differences in the fluid pressures exerted thereon.

20. A temperature conditioning system which comprises:
 a primary heat source;
 refrigerant storage means containing a refrigerant separated into a liquid phase and a gaseous phase;
 a heat extraction pump having an inlet portion and an outlet portion, the inlet portion being connected to the portion of the refrigerant storage means containing the liquid refrigerant;
 a secondary heat source;
 a heat extraction evaporator connected in a heat exchanging relationship with the secondary heat source, the heat extraction evaporator having an inlet portion and an outlet portion, the inlet portion being connected to the outlet portion of the heat extraction pump and the outlet portion being connected to the refrigerant storage means;
 a drive pump having an inlet portion and an outlet portion, the inlet portion being connected to the portion of the refrigerant storage means containing the liquid refrigerant;
 a drive evaporator connected in a heat exchanging relationship with the primary heat source, the drive evaporator having an inlet portion and an outlet portion, the inlet portion being connected to the outlet portion of the drive pump;
 an ejector having a drive inlet portion connected to the outlet portion of the drive evaporator, a suction inlet portion connected to the portion of the refrigerant storage means containing the gaseous refrigerant, a mixing portion in fluid communication with the drive and suction inlet portions, and a diffuser portion in fluid communication with the mixing portion;
 a condensor connected in a heat exchanging relationship with a heat sink, the condensor having an inlet portion and an outlet portion, the inlet portion being connected to the diffuser portion of the ejector and the outlet portion being connected to the refrigerant storage means;

an expansion valve means operatively connected to and in fluid communication with the refrigerant storage means and the outlet portion of the condensor; and expansion valve control means operatively connected to the expansion valve means and the inlet of the secondary heat source for controlling the expansion valve means to maintain a temperature within the refrigerant storage means lower than the inlet temperature of the secondary heat source.

21. The temperature conditioning system of claim 20 wherein the refrigerant storage means comprises:
an expansion tank containing refrigerant separated into a liquid phase and a gaseous phase.

22. The temperature conditioning system of claim 21 wherein the refrigerant storage means further comprises:
a surge tank containing refrigerant interposed between the outlet portion of the condensor and the expansion valve.

23. The temperature conditioning system of claim 22 wherein the drive pump is further characterized as having the inlet portion thereof connected to the portion of the surge tank containing the liquid phase of the refrigerant.

24. The temperature conditioning system of claim 22 wherein the drive pump is further characterized as having the inlet portion thereof connected to the portion of the expansion tank containing the liquid phase of the refrigerant.

25. The temperature conditioning system of claim 24 defined further to include:
means interposed between the surge tank, the expansion tank and the inlet to the drive pump for selectively adjusting the relative amounts of liquid refrigerant being drawn from the expansion tank and the surge tank into the drive pump.

26. The temperature conditioning system of claim 20 further comprising:
a blower connected between the suction inlet portion of the ejector and the portion of the refrigerant storage means containing the gaseous refrigerant; and
blower control means responsive to the pressure in the portion of the refrigerant storage means containing the gaseous refrigerant, the blower control means actuating the blower in response to a pressure exceeding a predetermined pressure.

27. The temperature conditioning system of claim 20 further comprising:
a pressure control valve interposed between the diffuser portion of the ejector and the inlet portion of the condensor; and
pressure control means responsive to the temperature and pressure in the condensor, the pressure control means actuating the pressure control valve to maintain a predetermined relationship between said temperature and pressure.

28. The temperature conditioning system of claim 20 wherein the ejector is further defined to include a cooling jacket connected in heat exchanging relationship with at least a portion of the diffuser portion of said ejector, the cooling jacket being interposed between the drive pump and the inlet portion of the drive evaporator.

29. The temperature conditioning system of claim 20 further comprising:
a preheater comprising a heat source portion connected in a heat exchanging relationship with a heat sink portion thereof, the heat source portion being interposed between the diffuser portion of the ejector and the inlet portion of the condensor, and the heat sink portion being interposed between the outlet portion of the drive pump and the inlet portion of the drive evaporator.

30. The temperature conditioning system of claim 29 further comprising:
a subcooler comprising a heat source portion connected in a heat exchanging relationship with a heat sink portion thereof, the heat source portion being interposed between the outlet portion of the condensor and the refrigerant storage means, and the heat sink portion being interposed between the drive pump and the inlet portion of the drive evaporator.

31. The temperature conditioning system of claim 20 further comprising:
a superheater comprising a heat sink portion connected in a heat exchanging relationship with a heat source, the heat sink portion being interposed between the outlet portion of the drive evaporator and the drive inlet portion of the ejector.

32. The temperature conditioning system of claim 20 wherein the refrigerant is selected from the group consisting of trichloromonofloromethane, dichloromonofluromethane, trichlorotrifluroethane, and dichlorohexafluropropane and combinations thereof.

33. The temperature conditioning system of claims 20 or 31 wherein the heat energy source is a energy generation, collection and storage apparatus providing a heat transfer fluid.

34. The temperature conditioning system of claim 33 wherein the energy generation collection and storage apparatus includes an improved heat transfer fluid storage system comprising:
a first insulated, heat transfer fluid storage tank;
a second insulated, heat transfer fluid storage tank; and
fluid flow control means responsive to the temperature of the heat transfer fluid in each of the first and second storage tanks, the fluid flow control means providing flow of the heat transfer fluid from the one of the first and second storage tanks containing the higher temperature heat transfer fluid for return to the other of said storage tanks.

35. The temperature conditioning system of claim 34 wherein the first and second storage tanks of the heat transfer fluid storage system are further characterized as forming respective end portions of an elongated heat transfer fluid reservoir having a substantially fluid impermeable, insulating barrier interposed between said end portions and in relative sealing engagement with the inner periphery thereof, the barrier being movable between said ends in response to differences in the fluid pressures exerted thereon.

* * * * *